UNITED STATES PATENT OFFICE.

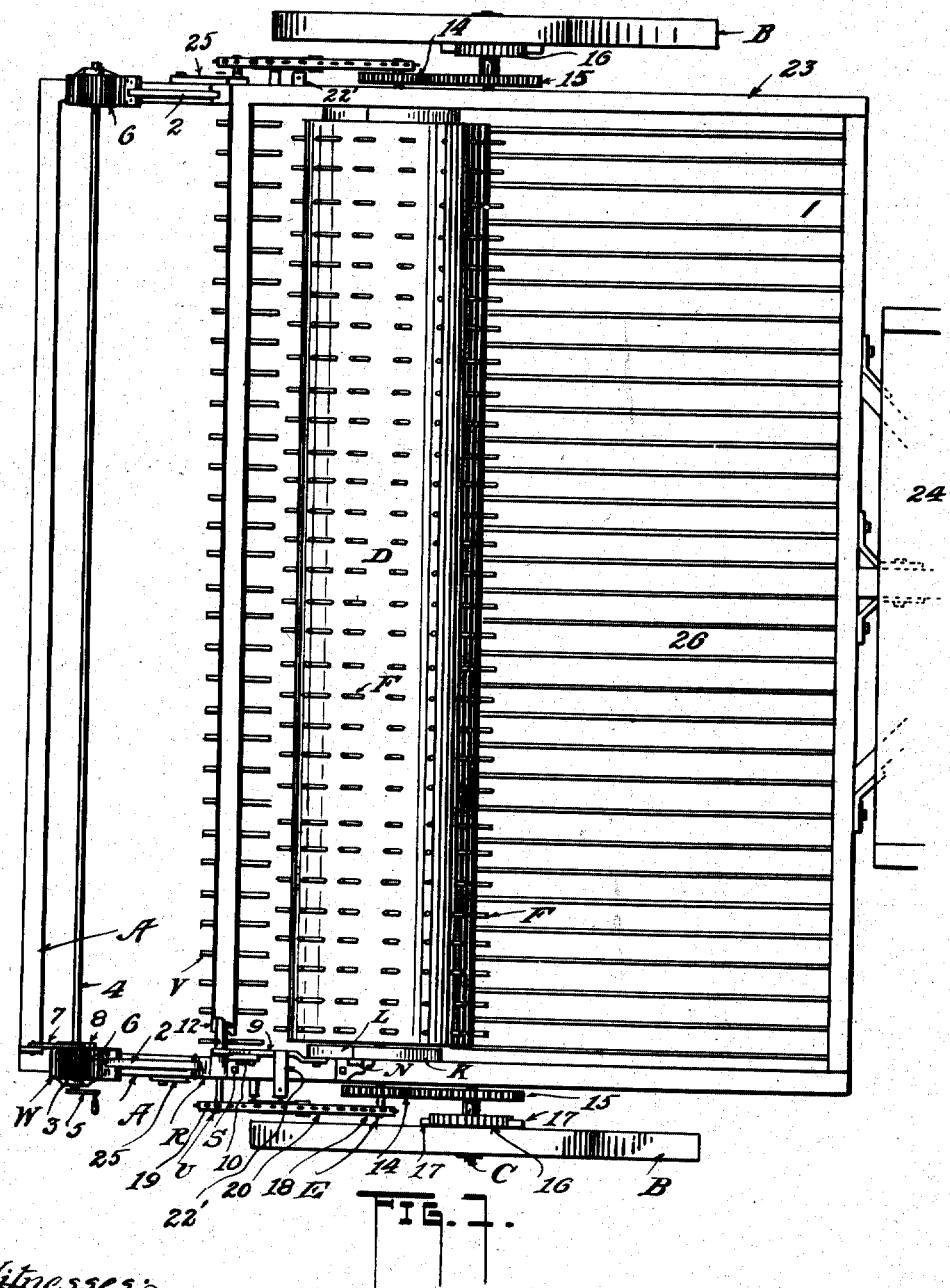

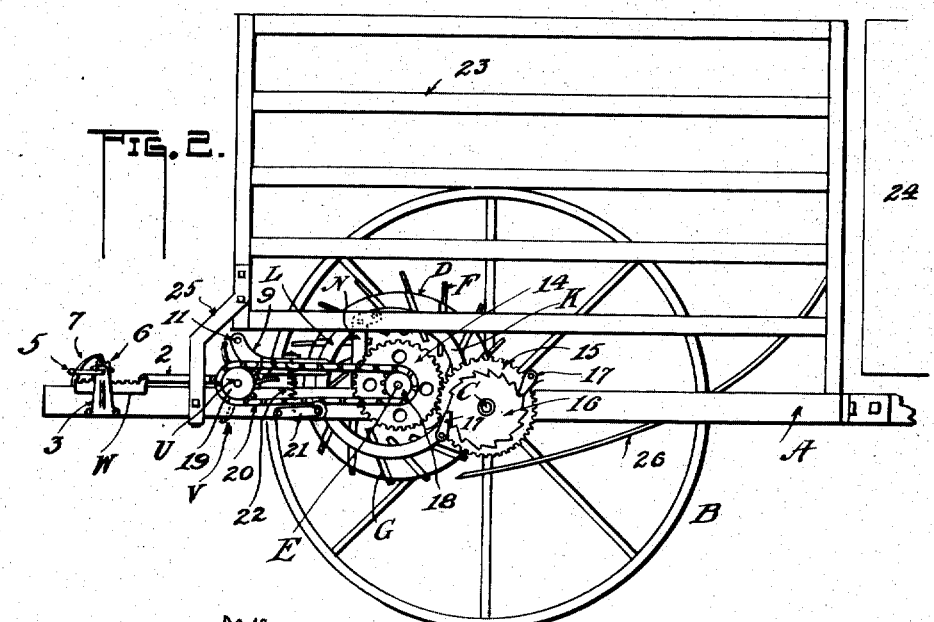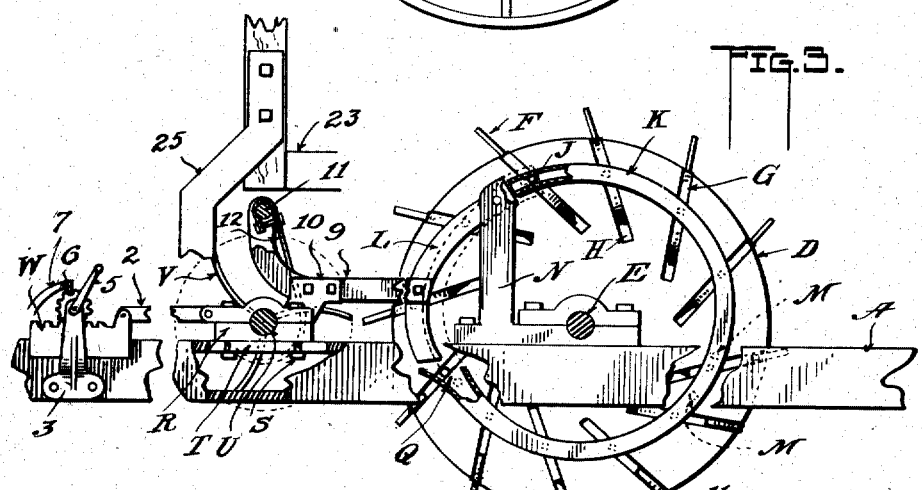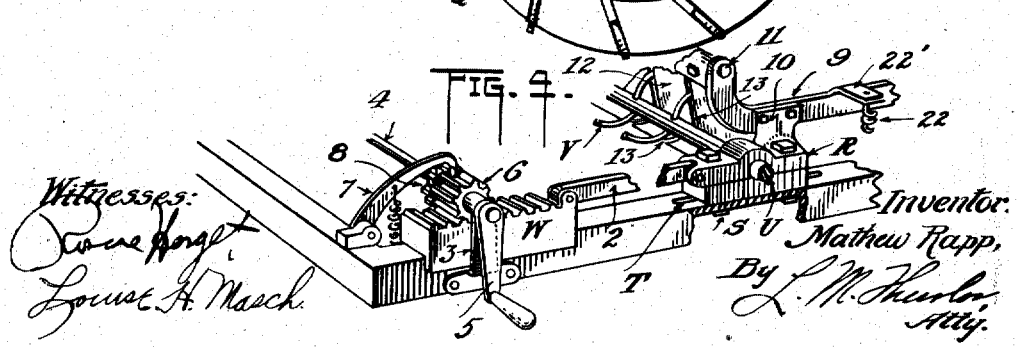

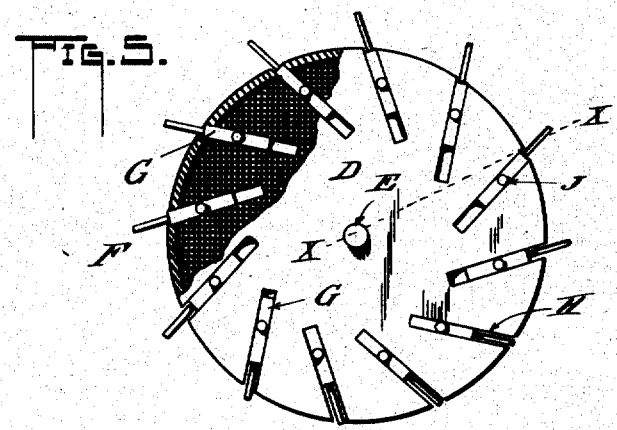
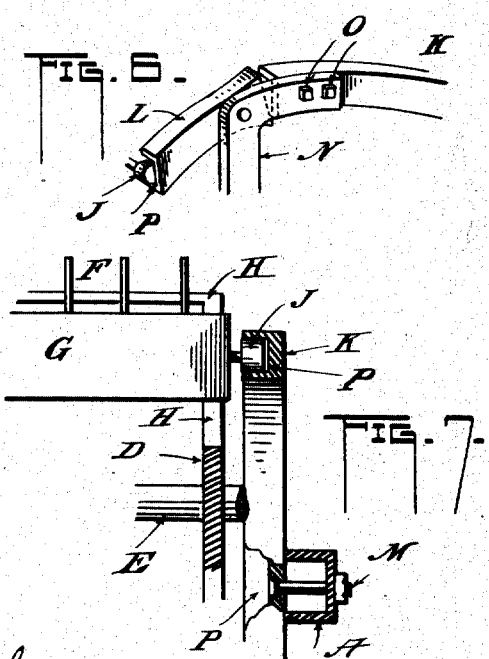

MATHEW RAPP, OF MORTON, ILLINOIS.

STRAW-SPREADER.

1,282,947.   Specification of Letters Patent.   Patented Oct. 29, 1918.

Application filed February 27, 1917.   Serial No. 151,192.

*To all whom it may concern:*

Be it known that I, MATHEW RAPP, citizen of the United States, residing at Morton, in the county of Tazewell and State of Illinois, have invented certain new and useful Improvements in Straw-Spreaders; and I do hereby declare that the following is a full, clear, and exact description of the invention, which will enable others skilled in the art to which it appertains to make and use the same.

This invention relates to improvements in that class of implements known as straw spreaders.

The main object of the invention is to furnish a straw spreader, the teeth of one of whose discharging members may be adjusted a greater or less distance from the surface or periphery of the member carrying them whereby the straw may be discharged in any bulk desired.

Another object is to provide a straw discharging member having a series of teeth that may be extended a greater or less degree from it, and a second member, including a series of teeth working in conjunction with the first, adjustable relatively to the member while maintaining both series of teeth in the same working relation relatively in any adjusted position.

Still another object is to provide a discharge cylinder for a straw spreader having teeth projected from and withdrawn into said cylinder by means of a cam-track, part of the said track being manually adjusted whereby the teeth can be extended or withdrawn for varying the thickness or bulk of the straw discharged.

Another and important object is to provide a cylinder with a series of teeth whose points are advanced in the direction of rotation beyond their roots whereby the straw will be better held and carried to the discharging position.

In addition, other advantages will appear herein aided by the accompanying drawing which shows one of the embodiments of the invention, it being understood that various changes may be made in the arrangement of the parts illustrated whereby the desired aims are realized without departing from the inventive idea.

Figure 1 is a plan of my complete straw spreader.

Fig. 2 is a side elevation of the same.

Fig. 3 is a view similar to Fig. 2, showing a portion of the machine on a much larger scale with certain parts in section.

Fig. 4 shows a portion of the machine in perspective.

Fig. 5 is an end elevation of a cylinder showing parts broken away.

Fig. 6 shows, in perspective, a detail of a cam-track; and,

Fig. 7 is a longitudinal section of part of one of the cylinders and a cam-track.

My invention includes a pair of cylinders the teeth of one of which are movable longitudinally so as to be projected therefrom and withdrawn into the same, a cam-track for causing the movement of said teeth in the manner described, an adjustable portion of said track to vary the extent to which the teeth may be extended, the other cylinder of the pair being adjustable in the direction of the first and operatively connected to the said adjustable portion for the purpose to be more fully described.

The teeth of the first or what may be termed the main cylinder do not move outward from the center of rotation but tangentially to a circle described from said axis of rotation.

A represents the main frame of the machine, and B the supporting wheels which carry the frame by means of stub axles C secured to and projecting from opposite ends of said frame.

D is a main cylinder rotated by and suitably secured to a shaft E journaled on the frame A in any approved manner, the projecting ends of the shaft carrying certain gearing to be described.

F indicates a series of teeth projecting from the periphery of said cylinder D, the same being secured to slats G, one of which is shown in Fig. 7. The cylinder is preferably hollow, being closed at its ends, and said ends are slotted at H and said slots, as shown, may open through the periphery of the cylinder if desired, as shown in Fig. 7, though this is not important since the teeth only may project therethrough. These slots are disposed each at an angle to a plane lying parallel to the axis of rotation of the cylinder and extending to the point at the periphery of the cylinder where the slot opens through it or from which a tooth extends, see dotted lines $x$—$x$, Fig. 5, so that the opening of the slot at the periphery of the cylinder lies in advance of the bottoms of said slots. In the rotation of the cylinder the points of the teeth will, therefore, lie in advance of their roots.

The slats are adapted to have movement within the slots and each carries at each end a roller J to engage and travel in a stationary portion K of a cam-track, and a movable portion L of said track. The stationary portion is secured in any suitable manner to the frame, for instance, by means of bolts M, one of which is shown in Fig. 7, in addition to which, if desired, may be used an upstanding arm N providing a further support, as shown in Fig. 6, bolts O being the securing means. The movable portion L is pivoted at its upper end to the arm N, or it may be pivoted to the stationary part, and is slightly flared as indicated in Fig. 6 so that the guide-way P therein will be slightly wider whereby in any position of adjustment the rollers passing from the fixed portion K will be readily directed into it.

The free opposite end of said movable portion lies opposite the flared mouth Q of the free end of the fixed portion, the mouth of the latter being flared to an extent sufficient to receive the rollers J in any position of the said free end of the movable part, as clearly shown in Fig. 3.

R indicates a bearing slidably mounted on each end of the frame A and including studs S extending through a slot T in the top of the frame, said slot acting as a guide for the bearing.

U is a shaft carried in said bearings and provided with a series of teeth V, which as a unit will be termed in the claims a member or cylinder. W is a toothed rack suitably guided on the frame at each end rearward of the described bearings R, each being connected with one of the latter by a rod 2, for example. 3 is a bearing at each end of the frame carrying a shaft 4 provided with a crank 5 and further provided with a pair of pinions 6, each of which meshes with one of said racks. 7 is a pawl which may engage between two of the teeth of the pinion or which may engage a special toothed member 8 fixed on the shaft by which the pinions and the racks may be held stationary.

9 is an arm pivotally attached to the movable cam-track portion L and secured to an arm 10 uprising from a bearing R, for instance, said arm 9 extending upward to a point above the shaft U. 11 is a rod extending between and carried by the arms 9. 12 is an apron of any desired material such as sheet metal clamped upon said rod 11, depending therefrom between the shaft and cylinder D and lying close to the former and extending partially around and beneath the shaft substantially as shown. Said apron is slotted at 13, Fig. 4, to permit the teeth V to pass therethrough, and provides for keeping the teeth stripped or cleared of the straw during operation.

14 is a gear secured on the shaft E and 15 is a gear meshing therewith, and affixed to 15 is a ratchet-wheel 16 rotated by pawls 17 mounted on the wheels B, the said gear 15 and the ratchet-wheel 16 being sleeved upon the studs C so as to turn thereon.

In the rotation of the wheels B the pawls drive the ratchet and gear in the same direction thereby imparting to the cylinder D through its gear 17 a reverse direction of movement or a direction of rotation contrary-clock-wise as viewed in the figures.

18 is a sprocket wheel on the shaft E and 19 is a similar wheel on the shaft N, motion being transmitted from the former to the latter and in the same direction by means of a sprocket chain 20, the teeth V being rotated in the same direction as the teeth F of the cylinder O, although the two series of teeth where they pass by one another will, of course, travel in opposite directions.

21 is a chain-tightener, 22, Fig. 4, being a spring attached to some fixed portion, such as a part 22' extending from the arm 9, to hold the said tightener with pressure against said chain. 23 is a rack to receive the straw deposited into the machine from a wagon 24 or other conveyance, the rear portion of said rack being supported on any suitable part 25, for example, secured to and arising from the frame A.

26 indicates a series of teeth, to also receive the straw, secured to any desired part of the machine and extending to and beneath the cylinder D. Straw thrown into the machine is gathered by the teeth F of the cylinder D and carried over rearwardly for discharge between said cylinder and the teeth V.

The teeth F are set at an angle to the periphery of the cylinder D so that they will more readily engage and hold the straw than though they were to radiate from the center of rotation of said cylinder, the angle described by any one tooth and a line tangential to the surface of the latter at the root of the tooth being an acute one at that side of the tooth carrying the straw.

The cam-track is of such a form and is so placed in relation to the center of rotation of the cylinder that the teeth F at the upper half of the cylinder are extended their entire length so as to lift a maximum amount of the straw and so, also, that, after passing by the teeth V, are retracted quickly until, at the bottom or underside of the cylinder but little of each tooth projects so that the straw will be cleanly discharged and cannot wrap on the teeth nor around the cylinder.

The movable portion L of the cam-track may be adjusted to and from the center of rotation by shifting the bearing R which carries the arm 9 having attachment to said movable portion, said movement being furnished by the pinion and rack previously described or any other desired mechanism that will move the shaft U to the same extent throughout its length.

In this movement the teeth F as they pass the teeth V project from the periphery of the cylinder D to any desired extent depending upon the bulk of straw it is to discharge, the teeth at this point projecting their full length or but a short distance as may be desired.

The adjustment of the bearing R in the direction of the cylinder D thus results in the movement of the track portion L to obtain the required projection of the teeth, it being understood that the rollers J of the slats G cause the teeth to be projected and withdrawn as they follow in the groove P.

By the structure herein described and shown, or its equivalent, I am enabled to adjust the small cylinder in the direction of the large one but always keep the two series of teeth in the same working relation—that is, the space between their points is constant at all times so that the combing action on the straw is more uniform in that no more straw will be allowed to pass at one time than at another over and above the predetermined bulk to be carried through. The straw is inclined to "bunch" where it is carried through to delivery by the teeth F but if thoroughly combed and thinned only an amount in thickness substantially equal to the length of the teeth F can pass.

The apron 12 prevents the wrapping of the straw about the shaft U and around its teeth, keeping the latter stripped clean. The cam-track and all the operating parts such as the gears and sprockets may be covered so as to prevent the straw interfering with the operation of the machine, but this has not been thought necessary to illustrate since it is a well known expedient.

In the forward movement of the machine the wheels B through the pawls 17 rotate the ratchet wheel 16 and the gear 15 to transmit an opposite direction of rotation to the cylinder D as already stated, and in turning around or in backing the pawls will ride over the teeth of the ratchet-wheel as either wheel lags as is well understood.

Having thus described my invention, I claim:—

1. In a straw spreader, the combination of a pair of members each including a series of teeth, one of the series of teeth being movable in the direction of their lengths relatively to the member carrying them, and adjustable means for exposing more or less of the lengths of the teeth during a part of their travel, the member having the other series of teeth having a fixed relation to the said adjustable means and movable with it.

2. In a straw spreader, the combination of a pair of members each including a series of teeth, one of the series of teeth being movable in the direction of their lengths relatively to the member carrying them, adjustable means for exposing more or less of the lengths of the teeth during a part of their travel, and means to move the other member and said means simultaneously and to the same degree, the teeth of said other member and the teeth controlled by the said means bearing the same relation at all times.

3. In a straw spreader, the combination of a support, a cylinder mounted thereon including a series of teeth, a second cylinder adjacent thereto also provided with a series of teeth, bearings carrying said second cylinder adjustable in the direction of the first said cylinder, an adjustable track with which the first series of teeth operatively engage for exposing more or less of said teeth, and means connecting the said adjustable track and the said bearings.

4. In a straw spreader, the combination of a support, a member mounted thereon including a series of teeth, adjustable means to expose more or less of said series of teeth during a portion of their travel, and a second toothed member adjustable in the direction of the first said member.

5. In a straw spreader, the combination of a support, a member mounted thereon provided with a series of teeth, manually operated means to adjust the teeth whereby to expose more or less of the same beyond the surface of the member carrying them during a portion of their travel, and a second member mounted on the support including a series of teeth and adjustable in the direction of the first said member.

6. In a straw spreader, the combination of a support, a rotatable member mounted thereon including a series of teeth, a second member mounted on the support adjacent the first also including a series of teeth, means to adjust said second member in the direction of the first, and a movable portion operatively connected to a part of the said means for exposing more or less of the length of the teeth of the first said member during a part of their travel.

7. In a straw spreader, the combination of a support, a member mounted thereon including a series of adjustable teeth, a second member mounted on the support adjacent to and adjustable in the direction of the first, and itself including a series of teeth, an adjustable part operatively engaging the teeth of the first member during a part of their travel for at will exposing beyond the periphery of said cylinder more or less of said teeth in said part of their travel and mechanism for adjusting the said part and the second member simultaneously.

8. In a straw spreader, the combination of a support, a rotatable cylinder including a series of teeth movable therein for projection beyond its periphery, means adjustable relatively to the cylinder operatively engaging the teeth whereby in the rotation of said cylinder more or less of a part of the series of teeth will be projected while passing a given point in their travel, and a second rotatable cylinder including a series of teeth adjustable in the direction of the first said cylinder.

9. In a straw spreader, the combination of a support, a member including a series of teeth adapted for movement relatively thereto, adjustable means operatively engaging the teeth to at will expose more or less of a part of the series of teeth while passing a given point in their travel, and a member, also including a series of teeth, adjustable in the direction of the first described member substantially a distance equal to the greatest distance the said teeth of the first described member are exposed.

10. In a straw spreader, the combination of a support, a member including a series of teeth adapted for movement relatively thereto and to project to a greater or less extent therefrom, an adjustable part operatively engaging the teeth, a second member provided with teeth to coöperate with those of the first member, and means to adjust said part whereby to expose more or less of the teeth of the first member while passing the teeth of the second member.

11. In a straw spreader, the combination of a support, a member including a series of teeth adapted for movement relatively thereto and to project to a greater or less extent therefrom, an adjustable part operatively engaging the teeth, a second member provided with teeth to coöperate with those of the first member, and means to adjust said part whereby to expose more or less of the teeth of the first member while passing the teeth of the second member, said second member being adjustable in the direction of the first.

12. In a straw spreader, the combination of a support, a member including a series of teeth adapted for movement relatively thereto and to project to a greater or less extent therefrom, an adjustable part operatively engaging the teeth, a second member provided with teeth to coöperate with those of the first member, means to adjust said part whereby to expose more or less of the teeth of the first member while passing the teeth of the second member, said second member being adjustable in the direction of the first, and manually operated means coöperating with the first said means to impart a like amount of movement to said second member and said teeth of the first member.

13. In a straw spreader, the combination of a support, a rotating cylinder, a series of teeth thereon adapted for movement relatively thereto, a second cylinder coöperating with the first and also including a series of teeth, a movable part operatively engaging the movable teeth of the first named cylinder arranged to expose more or less of the length of said teeth while passing between the axes of the two cylinders, and means to adjust the second cylinder and said movable part simultaneously.

14. In a straw spreader, the combination of a support, a cylinder rotatably mounted thereon, including a series of teeth adapted for movement in the direction of their lengths, a movable part operatively engaging the teeth in a portion of their travel and adapted to adjust them with respect to the surface of the cylinder whereby to at will expose more or less of their lengths beyond said surface, a second toothed cylinder operating in conjunction with the first, and means operatively connecting the second named cylinder with said movable part, the latter and said cylinder bearing the same relative positions irrespective of the degree of adjustment imparted to them.

15. In a straw spreader, the combination of a support, a cylinder rotatably mounted thereon including a series of teeth adapted for movement in the direction of their lengths, a movable part operatively engaging the teeth in a portion of their travel and adapted to adjust them with respect to the surface of the cylinder whereby to at will expose more or less of their lengths beyond said surface, a second toothed cylinder operating in conjunction with the first, means operatively connecting the second named cylinder with said movable part, the latter and said cylinder bearing the same relative positions irrespective of the degree of adjustment imparted to them, and means to move one of the described parts.

16. In a straw spreader, the combination of a support, a cylinder rotatably mounted thereon including a series of teeth adapted for movement in the direction of their lengths, a movable part operatively engaging the teeth in a portion of their travel and adapted to adjust them with respect to the surface of the cylinder whereby to at will expose more or less of their lengths beyond said surface, a second toothed cylinder operating in conjunction with the first, means operatively connecting the second named cylinder with said movable part, the latter and said cylinder bearing the same relative positions irrespective of the degree of adjustment imparted to them, and means to impart rotation to the cylinders in the same direction.

17. A straw spreader, including in its construction a receptacle for the straw and an outlet therefrom, a toothed cylinder rotatably mounted at said outlet, the teeth being movable in the direction of their lengths, and a part with which the teeth successively engage in the rotation of the cylinder, said part adapted by its adjustment to project the teeth to a greater or less extent beyond the periphery of the cylinder at said outlet.

18. A straw spreader, including in its construction a receptacle for the straw and an outlet therefrom, a toothed cylinder rotatably mounted at said outlet, the teeth being movable in the direction of their lengths, and a track with which the teeth operatively engage during rotation of the cylinder including an adjustable part adapted by its adjustment to project the teeth to a greater or less extent beyond the periphery of the cylinder at said outlet, the track adapted in its relation to said cylinder to retract the teeth in that part of the cylinder lying outside the receptacle.

19. A straw spreader, including in its construction a receptacle for the straw and an outlet therefrom, a toothed cylinder rotatably mounted at said outlet, the teeth being movable in the direction of their lengths, a part with which the teeth successively engage in the rotation of the cylinder, said part adapted by its adjustment to project the teeth to a greater or less extent beyond the periphery of the cylinder at said outlet, and a series of teeth at said outlet operating in conjunction with the teeth of the cylinder.

In testimony whereof I affix my signature, in presence of two witnesses.

MATHEW RAPP.

Witnesses:
W. R. LACKLAND,
P. H. DODDS.

Copies of this patent may be obtained for five cents each, by addressing the "Commissioner of Patents, Washington, D. C."